(12) United States Patent
Terae

(10) Patent No.: US 11,115,543 B2
(45) Date of Patent: Sep. 7, 2021

(54) IMAGE PROCESSING APPARATUS, AND CONTROL METHOD AND STORAGE MEDIUM THEREOF

(71) Applicant: CANON KABUSHIKI KAISHA, Tokyo (JP)

(72) Inventor: Hisashi Terae, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/895,895

(22) Filed: Jun. 8, 2020

(65) Prior Publication Data

US 2020/0396342 A1 Dec. 17, 2020

(30) Foreign Application Priority Data

Jun. 11, 2019 (JP) .............................. JP2019-108887

(51) Int. Cl.
*H04N 1/00* (2006.01)

(52) U.S. Cl.
CPC ..... *H04N 1/00037* (2013.01); *H04N 1/00076* (2013.01); *H04N 1/00082* (2013.01); *H04N 1/00411* (2013.01)

(58) Field of Classification Search
None
See application file for complete search history.

(56) References Cited

U.S. PATENT DOCUMENTS

| 5,909,603 | A | * | 6/1999 | Suzuki | ............... | G03G 21/1882 |
| | | | | | | 399/13 |
| 6,201,771 | B1 | * | 3/2001 | Otsuka | ................. | G06Q 20/123 |
| | | | | | | 369/30.32 |
| 2014/0268209 | A1 | * | 9/2014 | Yokoyama | ........... | G06F 3/1261 |
| | | | | | | 358/1.14 |

FOREIGN PATENT DOCUMENTS

JP 2017-209870 A 11/2017

\* cited by examiner

*Primary Examiner* — Frantz Bataille
(74) *Attorney, Agent, or Firm* — Canon U.S.A., Inc. I.P. Division

(57) ABSTRACT

An image processing apparatus includes an operation unit, a detection unit, an identification unit, and a controller. The operation unit includes an operation system to receive a user touch operation, and a display system to display an image. The detection unit detects a contact of an information storage medium. The identification unit identifies a location in the image processing apparatus at which an abnormality has occurred. Where the location at which the abnormality has occurred is identified to be only the operation system and the detection unit detects the information storage medium contact, the controller performs control to continue processing on the image processing apparatus on the display system. Where at least the identification unit identifies that the abnormality has occurred in the display system, the controller performs control at least to print a document indicating a method for continuing the processing on the image processing apparatus.

7 Claims, 15 Drawing Sheets

FIG.7

 PLEASE CYCLE THE POWER WITH THE POWER SWITCH ON THE RIGHT SIDE OF THE MAIN BODY · IF THE APPARATUS DOES NOT WORK NORMALLY EVEN AFTER YOU FOLLOW THE ABOVE INSTRUCTION, PLEASE CONTACT THE SERVICE IN CHARGE AND REPORT THE FOLLOWING CODES.

ERROR CODE:
▷ E000xxx-0000:

ERROR LOCATION:
▷ U000xxx-0000:

 TO CONTINUE THE OPERATION OF THE MAIN BODY IMMEDIATELY, YOU CAN CARRY OUT COPYING BY SETTING PAPER AND TOUCHING THE CARD READER WITH THE IC CARD.

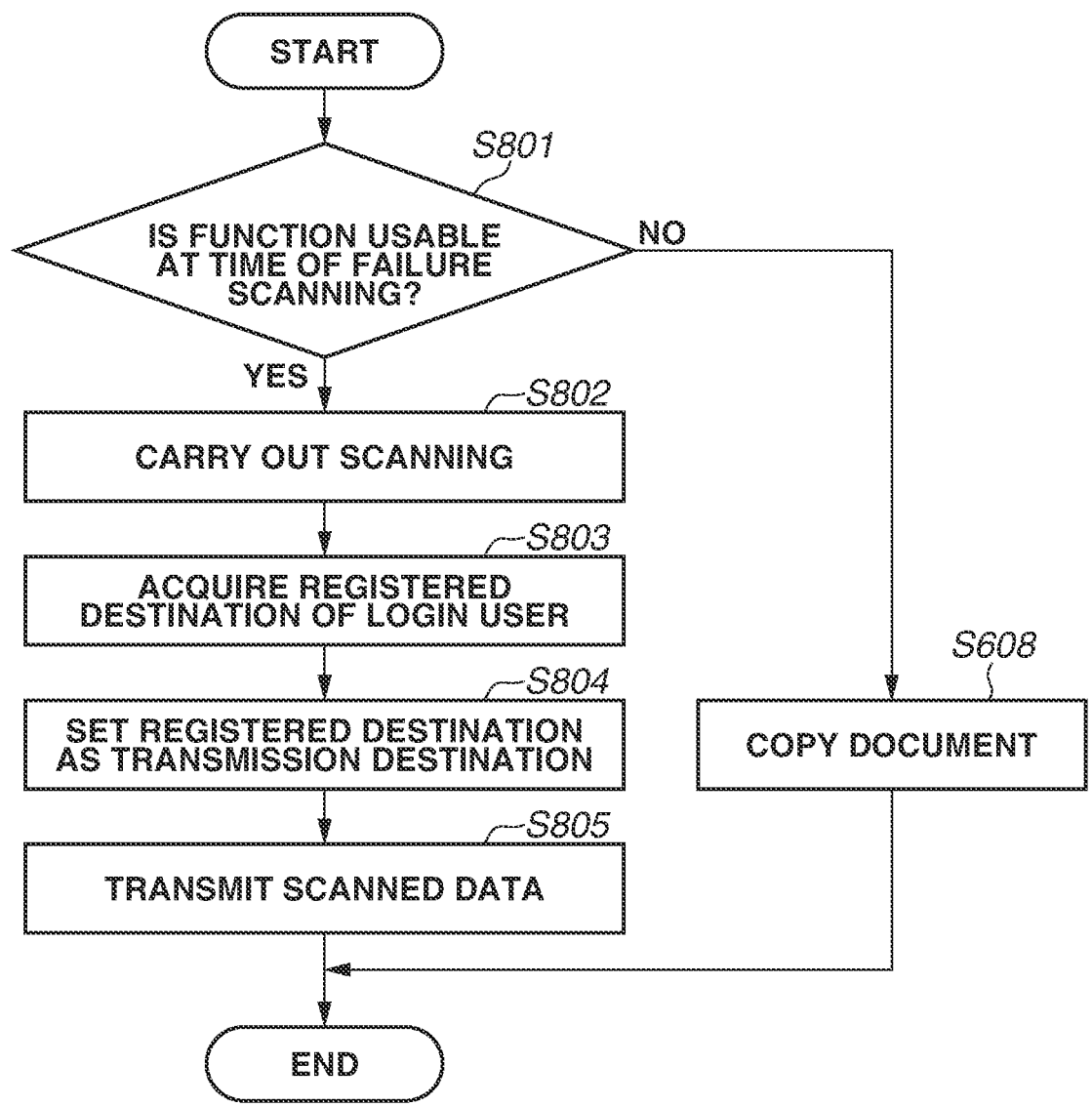

FIG.9

| ITEM | VALUE |
|---|---|
| USERNAME | UserA |
| MAIL ADDRESS | bbb@xxx.co.jp |
| USER TYPE | GENERAL USER |
| DOMAIN | localhost |

*FAILURE HAS OCCURRED IN THE OPERATION PANEL.
 PLEASE READ THE FOLLOWING INSTRUCTION

PLEASE CYCLE THE POWER WITH THE POWER
SWITCH ON THE RIGHT SIDE OF THE MAIN BODY

· IF THE APPARATUS DOES NOT WORK NORMALLY EVEN AFTER YOU
  FOLLOW THE ABOVE INSTRUCTION, PLEASE CONTACT THE SERVICE
  IN CHARGE AND REPORT THE FOLLOWING CODES.

ERROR CODE:

E000xxx-0000:

ERROR LOCATION:

U000xxx-0000:

TO CONTINUE THE OPERATION OF THE MAIN BODY IMMEDIATELY, YOU
CAN CARRY OUT TRANSMISSION TO THE REGISTERED DESTINATION
OF THE CURRENT LOGIN USER (bbb@xxx.co.jp) BY SETTING
PAPER AND TOUCHING THE CARD READER WITH THE IC CARD.

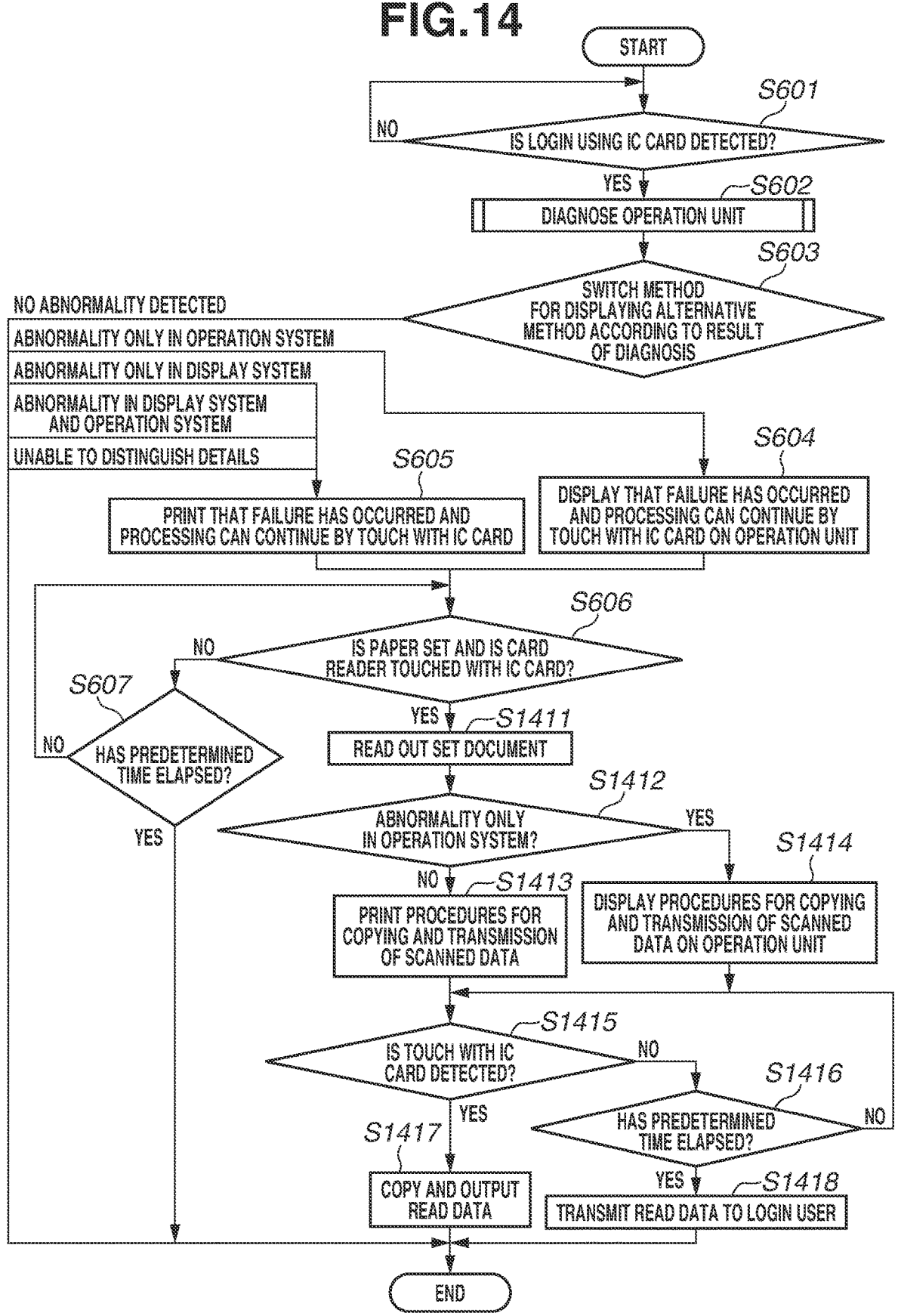

 PLEASE CYCLE THE POWER WITH THE POWER SWITCH ON THE RIGHT SIDE OF THE MAIN BODY · IF THE APPARATUS DOES NOT WORK NORMALLY EVEN AFTER YOU FOLLOW THE ABOVE INSTRUCTION, PLEASE CONTACT THE SERVICE IN CHARGE AND REPORT THE FOLLOWING CODES.

▷ ERROR CODE:
E000xxx-0000:

▷ ERROR LOCATION:
U000xxx-0000:

 TO CONTINUE THE OPERATION OF THE MAIN BODY IMMEDIATELY, YOU CAN START READING OUT THE DOCUMENT AND SCAN OR COPY IT BY SETTING PAPER AND TOUCHING THE CARD READER WITH THE IC CARD.

 TO COPY THE READ DOCUMENT, PLEASE TOUCH THE CARD READER WITH THE IC CARD AGAIN.

OTHERWISE, THE READ DOCUMENT WILL BE TRANSMITTED TO THE REGISTERED DESTINATION OF THE CURRENT LOGIN USER (bbb@xxx.co.jp).

IMAGE PROCESSING APPARATUS, AND CONTROL METHOD AND STORAGE MEDIUM THEREOF

BACKGROUND

Field

The present disclosure relates to an image processing apparatus including a display system and an operation system, and a control method and a storage medium thereof.

Description of the Related Art

There is known such a configuration that, when an abnormality has occurred in an image processing apparatus such as a multifunction peripheral, information regarding the abnormality and a method for dealing with the abnormality are displayed on a screen of the image processing apparatus. A user can deal with this abnormality while referring to the displayed information Japanese Patent Application Laid-Open No. 2017-209870 discusses a configuration in which an abnormality in a multifunction peripheral, such as empty toner and a paper jam, and a method for dealing with this abnormality are displayed on a screen.

SUMMARY

According to an aspect of the present disclosure, an image processing apparatus includes an operation unit, a detection unit, an identification unit, and a controller. The operation unit includes an operation system to receive a user touch operation, and a display system to display an image. The detection unit detects a contact of an information storage medium. The identification unit identifies a location in the image processing apparatus at which an abnormality has occurred. Where the location at which the abnormality has occurred is identified to be only the operation system and the detection unit detects the information storage medium contact, the controller performs control to continue processing on the image processing apparatus on the display system. Where at least the identification unit identifies that the abnormality has occurred in the display system, the controller performs control at least to print a document indicating a method for continuing the processing on the image processing apparatus.

Further features of the present disclosure will become apparent from the following description of exemplary embodiments with reference to the attached drawings.

BRIEF DESCRIPTION OF THE DRAWINGS

FIG. 7 illustrates an example of a screen displayed on the operation unit when an abnormality has occurred only in an operation system.

FIG. 8 is a flowchart illustrating a flow of processing when scan processing or copy processing continues according to a second exemplary embodiment.

FIG. 9 illustrates an example of a table of current login user information.

FIG. 10 illustrates an example of printed paper output from a printer when an abnormality has occurred only in the operation system.

FIG. 14 is a flowchart illustrating a flow of processing for diagnosing a failure in the operation unit and causing the image processing apparatus to operate using the alternative method according to a fourth exemplary embodiment.

FIGS. 15A and 15B each illustrate an example of a screen displayed on the operation unit when it is determined that an abnormality has occurred only in the operation unit according to the fourth exemplary embodiment.

DESCRIPTION OF THE EMBODIMENTS

Image processing apparatuses including software keys instead of hardware keys have been increasingly manufactured as products. The employment of the software keys for the image processing apparatuses contributes to realizing an operation feeling like smart-phones on the image processing apparatuses. The software keys are mainly formed by a display system (for example, a liquid crystal panel) indicating, for example, an operation content of a key such as "print" and "scan", and an operation system (for example, a touch panel), which detects a user operation on the software keys. The software keys can be used only when both these systems operate normally. Therefore, in a case where an abnormality occurs in either one of the display system and the operation system, the software keys can become unusable. For example, the occurrence of an abnormality in the display system makes it impossible or at least not possible to recognize the display content. The occurrence of an abnormality in the operation system makes it impossible without more to perform processing corresponding to a touched portion regardless of how many times the user touches the key.

Specific examples of the abnormality here include a malfunction of the display function due to an abnormality in a screen display module (a partial failure in the liquid crystal panel, burnout of a backlight, a module wiring failure, or the like), and a malfunction of the operation function due to an abnormality in a touch panel module or hardware (a failure in a sensor or a module wiring failure). Although not affecting the functions of the image processing apparatus such as the print function and the scan function, these abnormalities create the state in which the software keys are unusable, and thus a user will not be able to use the other normally workable functions of the image processing apparatus. This raises the necessity of an alternative operation method for allowing the user to continuously use the functions of the image processing apparatus even when the software keys become unusable.

The present disclosure is directed to allowing processing in the image processing apparatus to be continuously performed even when an abnormality has occurred in one of the operation system and the display system.

In the following description, exemplary embodiments for implementing the present disclosure will be described with reference to the drawings.

Figure 1:
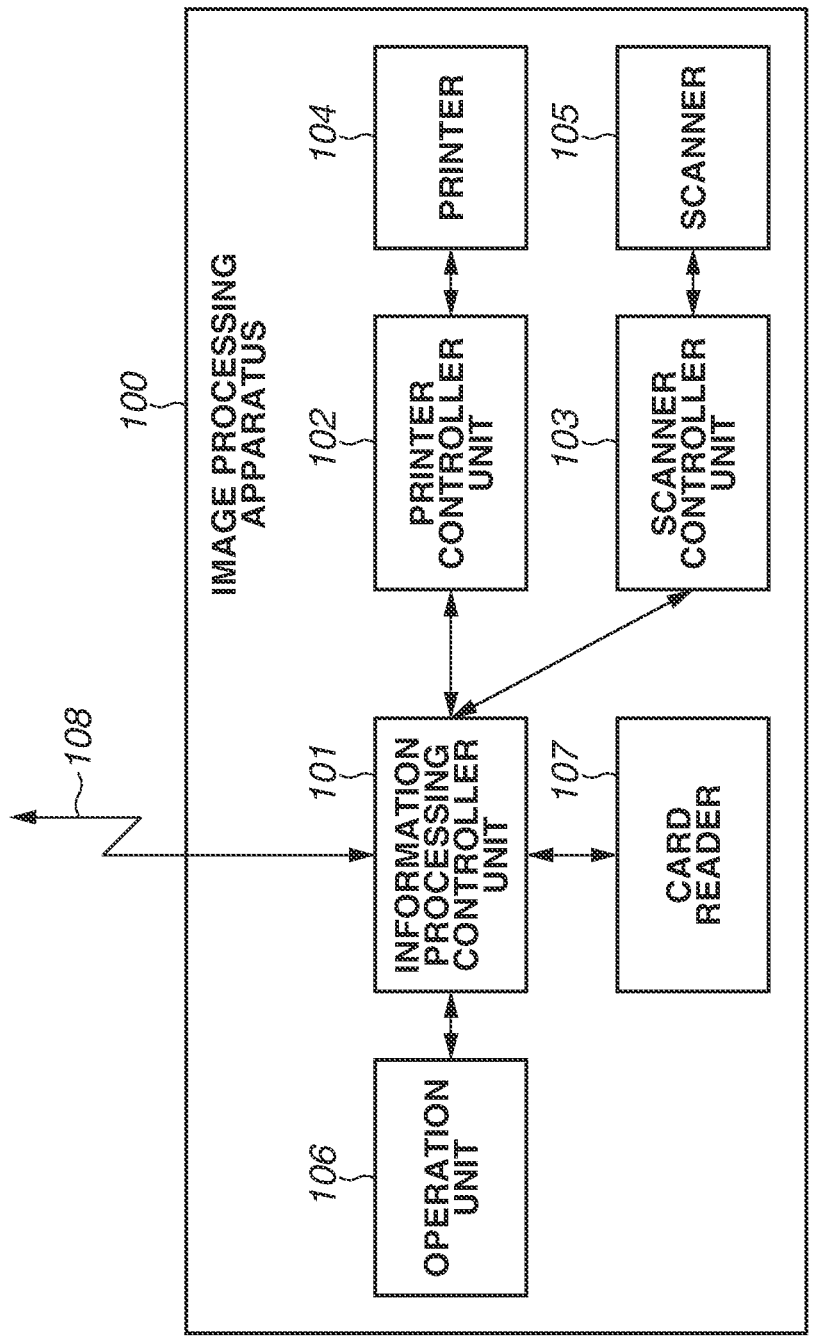
FIG. 1 is a block diagram illustrating a configuration of an image processing apparatus according to an exemplary embodiment of the present disclosure.

FIG. 1 is a block diagram illustrating a configuration of an image processing apparatus 100 according to a first exemplary embodiment of the present disclosure. The image processing apparatus 100 includes an information processing controller unit 101, a printer controller unit 102, a scanner controller unit 103, a printer 104, a scanner 105, an operation unit 106, and a card reader 107. The information processing controller unit 101 is a controller that controls over information processing control regarding the operation of the image processing apparatus 100, and the operation unit 106 is connected thereto. Further, the printer controller unit 102, which controls the printer 104 serving as an image output device, and the scanner controller unit 103, which controls the scanner 105 serving as an image input device, are connected to the information processing controller unit 101. A card reader 107 (a detection n is connected to the information processing controller unit 101 for reading an information storage medium such as an integrated circuit (IC) card prepared for authenticating a user. The card reader 107 controls the readout of authentication information from the IC card and acquires the authentication information read out from the IC card. The medium used for this is not limited to the IC card and may be any storage medium allowing identification of a user, and the authentication information may be acquired by reading out, for example, the authentication information of the user stored in a smart-phone, a quick response (QR) code (registered trademark), or other barcode. In this case, identification information for identifying the user is stored in the storage medium. This identification information may be the manufacturing number of the storage medium or a user code assigned to the user within the company, Then, a network 108 inputs and outputs information from and to an external personal computer (PC), a server, and another image processing apparatus.

Figure 2:
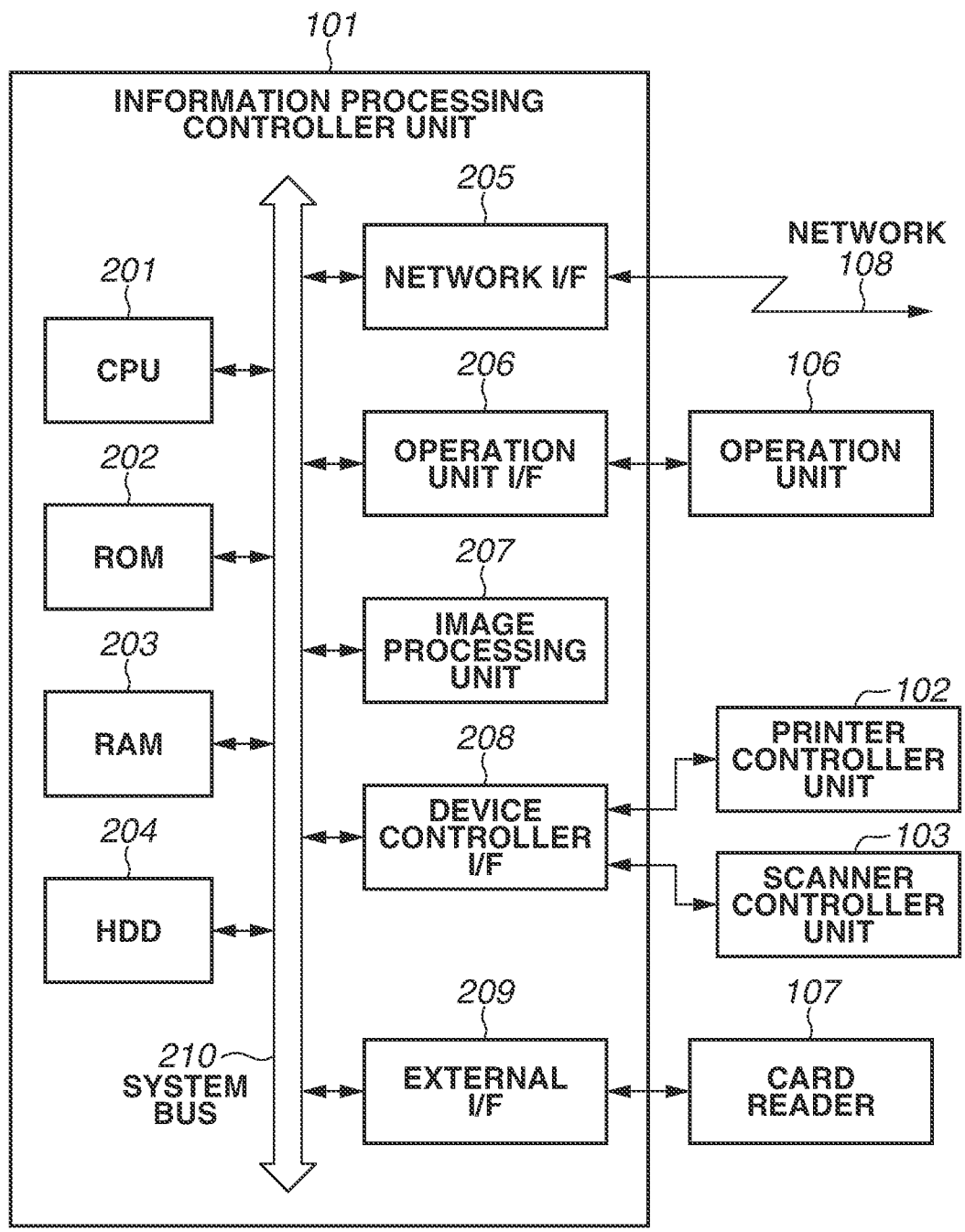
FIG. 2 is a block diagram illustrating a configuration of an information processing controller unit of the image processing apparatus.

FIG. 2 is a block diagram illustrating a configuration of the information processing controller unit 101 of the image processing apparatus 100 according to the present exemplary embodiment. The information processing controller unit 101 includes a central processing unit (CPU) 201, and starts up an operating system (OS) using a boot program stored in a read only memory (ROM) 202. The CPU 201 executes an application program stored in a hard disk drive (HDD) 204 on the OS, thereby realizing scanning, printing, facsimile (FAX), and various kinds of functionality using a network or a memory storage. The OS and the application program detect the occurrence of an error by monitoring the states of various kinds of units forming the apparatus. A random access memory (RAM) 203 is used as a work area of the CPU 201. The RAM 203 provides an image memory area for temporarily storing image data along with providing the work area. The HDD 204 stores therein the above-described application program, image data, various kinds of setting values, and a history.

An operation unit interface (I/F) 206, a device controller I/F 208, a network 205, an image processing unit 207, and an external I/F 209 are connected to the CPU 201 via a system bus 210, along with the ROM 202 and the RAM 203. The operation unit I/F 206 is an interface to the operation unit 106 including a liquid crystal display (LCD) unit on which a touch panel operation can be performed. The OS and the application program run by the CPU 201 generate screen display image data that is to be displayed on the operation unit 106, and output the generated data from the operation unit I/F 206 to the operation unit 106. The OS and the application program run by the CPU 201 acquire information input using the operation unit 106 as a user operation via the operation unit I/F 206. The printer controller unit 102 and the scanner controller unit 103 are connected to the device controller I/F 208, and the device controller I/F 208 carries out a synchronous/asynchronous conversion of the image data. The network I/F 205 is connected to the external network 108, and inputs and outputs information to and from the image processing apparatus 100 and a PC, a server, and another image processing apparatus via the network 108. The image processing unit 207 performs processing such as processing of an image to be output to the printer 104, processing of an image input from the scanner 105, an image rotation, an image compression, a resolution conversion, a color space conversion, and a tone conversion. The card reader 107 is connected to the external I/F 209, and reads out the authentication information stored in the IC card under the control by the CPU 201 and notifies the CPU 201 of the read authentication information via the external I/F 209.

Figure 3:
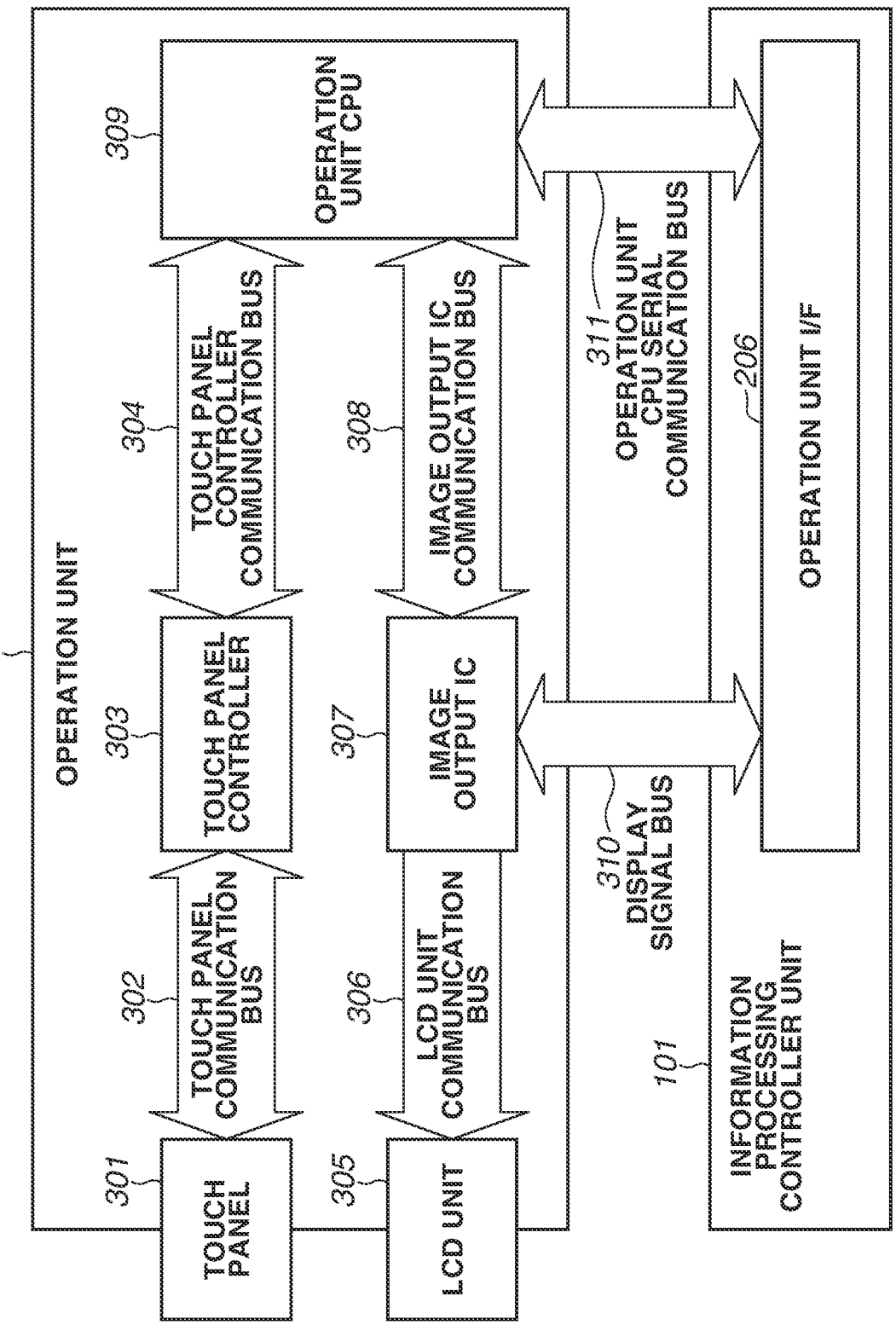
FIG. 3 is a block diagram illustrating an internal configuration of an operation unit and a configuration thereof for a connection to the information processing controller unit.

FIG. 3 is a block diagram illustrating an internal configuration of the operation unit 106 and a configuration thereof for the connection to the information processing controller unit 101. The operation unit 106 includes an LCD unit 305 and an image output IC 307, which are an example of the display system, and a touch panel 301 and a touch panel controller 303, which are an example of the operation system. The touch panel 301 is made from a highly transmissive material that may be based on a predetermined transmissiveness, and is mounted on the surface of the operation unit 106. The LCD unit 305 is placed immediately below the touch panel 301 with the touch panel 301 in a superimposed manner, and displays a graphical user interface screen, thereby allowing the user to input a touch onto the touch panel 301. The touch panel controller 303 acquires the touch operation performed by the user on the touch panel 301 as a coordinate value by connecting to and communicating with the touch panel 301 via a touch panel communication bus 302. The image output IC 307 transmits the screen display image data to the LCD unit 305 by connecting to and communicating with the LCD unit 305 via an LCD unit communication bus 306. An operation unit CPU 309 connects to and communicates with the touch panel controller 303 via a touch panel controller communication bus 304, and connects to and communicates with the image output IC 307 via an image output IC communication bus 308. The operation unit 106 is connected to the operation unit I/F 206 of the information processing controller unit 101 via a display signal bus 310 and an operation unit CPU serial communication bus 311. The screen display image data generated by the application program run by the CPU 201 of the information processing controller unit 101 is transmitted to the image output IC 307 via the display signal bus 310. The application program instructs the operation unit CPU 309 to control the operation unit 106 via the operation unit CPU serial communication bus 311, and acquires the coordinate value of the user operation on the touch panel 301 at the same time.

Figure 4:
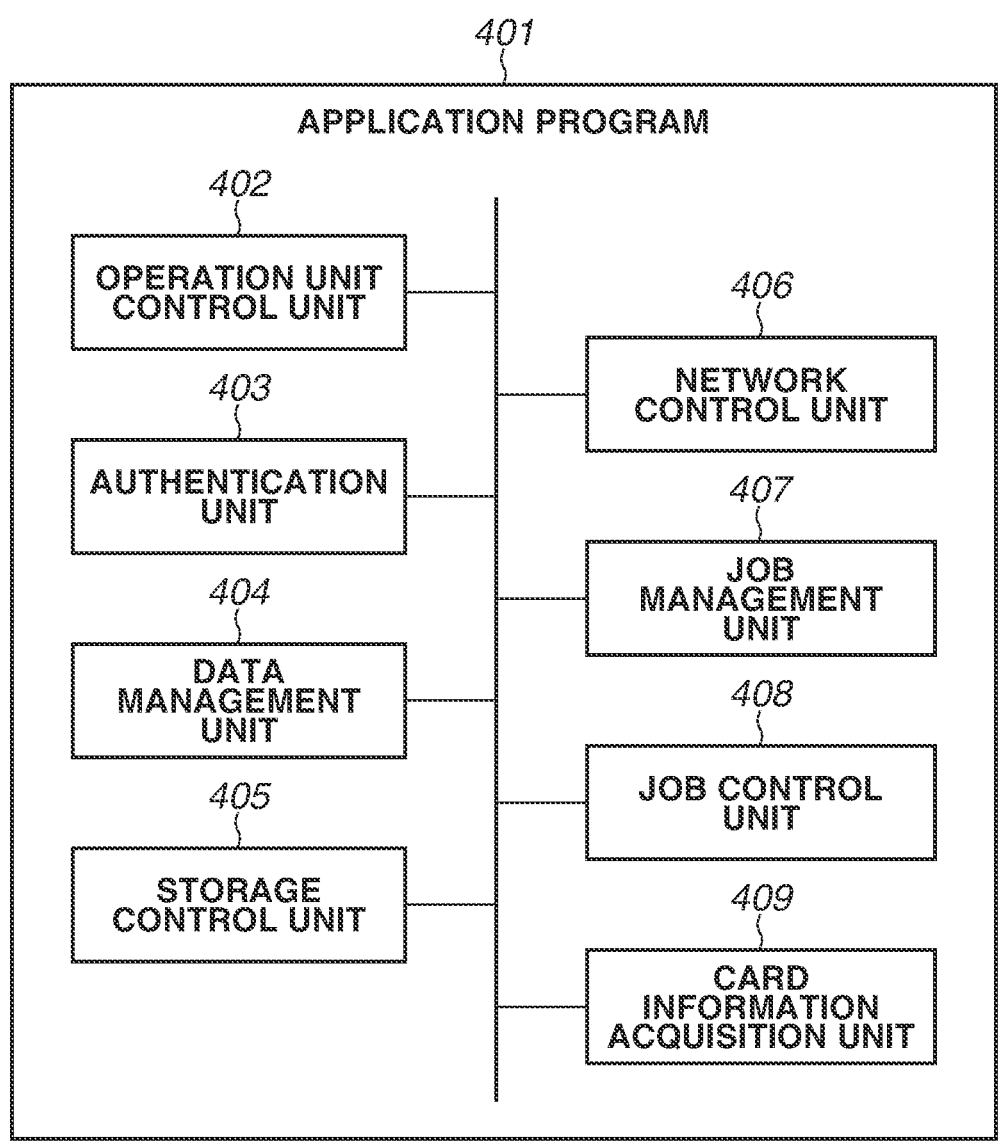
FIG. 4 is a block diagram illustrating a functional configuration of an application program of the image processing apparatus.

FIG. 4 is a block diagram illustrating a functional configuration of an application program of the information processing controller unit 101. An application program 401 is stored in any storage unit among the ROM 202, the RAM 203, and the HDD 204, and is executed by the CPU 201.

An operation unit control unit 402 receives the information that the user inputs using the operation unit 106 via the operation unit I/F 206, and transmits this information to an authentication unit 403, a data management unit 404, or a job management unit 407. Alternatively, the operation unit control unit 402 receives a response from the authentication unit 403, the data management unit 404, or the job management unit 407, and outputs this information to the operation unit 106 via the operation unit I/F 206.

A card information acquisition unit 409 detects that the IC card is held over the card reader 107, reads out and acquires the authentication information stored in the IC card, and transmits the acquired authentication information to the authentication unit 403.

The authentication unit 403 performs authentication processing based on the authentication information received from the operation unit control unit 402 and/or the card information acquisition unit 409, and returns the result thereof.

The data management unit 404 receives a request to write or read data from the operation unit control unit 402, a network control unit 406, or the job management unit 407, and transmits the request to write or read the data to a storage control unit 405. Alternatively, the data management unit 404 receives a response from the storage control unit 405, and transmits this info anon to the operation unit control unit 402, the network control unit 406, or the job management unit 407.

The storage control unit 405 receives the request to write or read data from the data management unit 404, and writes or reads the data into or from the HDD 204 and returns the result thereof to the data management unit 404. The network control unit 406 receives a request from a PC or another image processing apparatus via the network I/F 205. Then, the network control unit 406 requests processing to the data management unit 404 or the job management unit 407 according to the received request. Alternatively, the network control unit 406 receives a response from the data management unit 404 or the job management unit 407. Then, the network control unit 406 transmits the received response to the PC, the server, or the other image processing apparatus via the network I/F 205. The job management unit 407 receives a request to carry out a job from the operation unit control unit 402 or the network control unit 406, and manages the job. Then, the job management unit 407 requests a job control unit 408 to carry out the job or transmit the request to write or read data to the data management unit 404. Alternatively, the job management unit 407 receives a response from the data management unit 404 or the job control unit 408, and transmits the status of the job to the operation unit control unit 402 or the network control unit 406. The job control unit 408 receives a request to carry out a job from the job management unit 407, and controls the operation of the printer 102 or the scanner 105 via the device controller I/F 208. Alternatively, the job control unit 408 receives the operation state of the printer 102 or the scanner 105 via the device controller I/F 208, and transmits the received state to the job management unit 407.

<Processing for Detecting Abnormality in Operation Unit 106>

Figure 5:
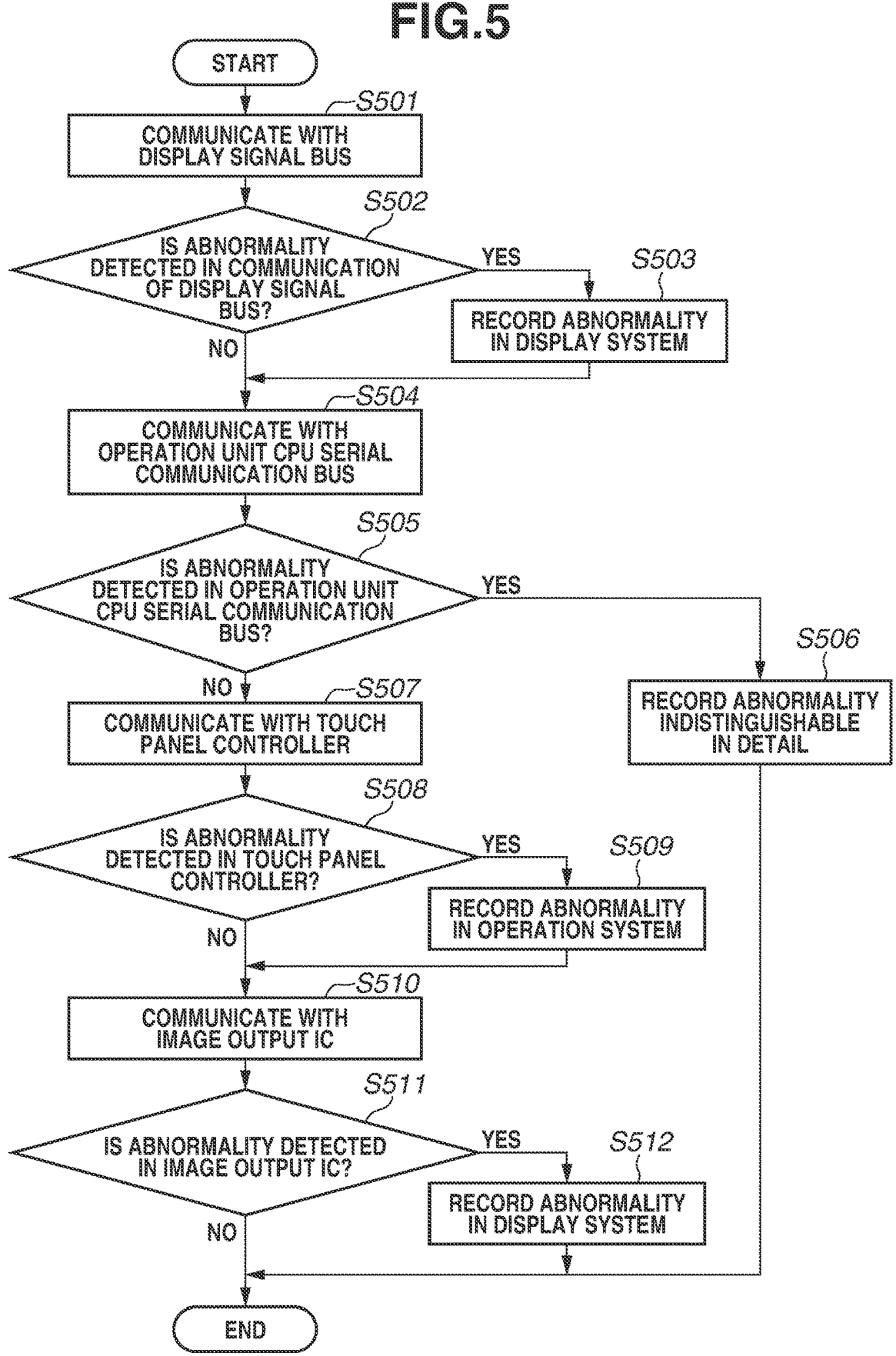
FIG. 5 is a flowchart illustrating a flow of processing for detecting an abnormality in an operation of the operation unit.

FIG. 5 illustrates processing performed mainly by the application program 401 of the information processing controller unit 101, which is processing for detecting an abnormality when the operation unit 106 is caused to work.

First, in step S501, the application program 401 communicates with the display signal bus 310. Then, in step S502, the application program 401 determines whether an abnormality in the communication is detected. Although any method may be employed at this time as the specific method for determining whether the communication is abnormal, it is determined whether the communication is abnormal based on whether a predetermined response is received as a result of the communication in the present exemplary embodiment. The same also applies to the following processing.

If an abnormality in the communication is detected in step S502 (YES in step S502), meaning that the screen display image data cannot be correctly transmitted via the display signal bus 310, the processing proceeds to step S503. Then in step S503, the application program 401 records information indicating the abnormality in the display signal bus 310 (the display system) into the RAM 203. The information indicating the abnormality includes at least an error code for identifying the error content or an error location code for identifying the error location. FIG. 7 also illustrates an example when the error code and the error location code are displayed on the image processing apparatus 100. In step S503, the application program 401 also records the information indicating the abnormality into the HDD 204, allowing the error history to be recorded and referred to as nonvolatile information.

Next, in step S504, the application program 401 communicates with the operation unit CPU serial communication bus 311. In step S505, the application program 401 determines whether an abnormality in the communication is detected. In a case where an abnormality in the communication is detected (YES in step S505), the processing proceeds to step S506. In such a case where an abnormality occurs in the communication with the operation unit CPU serial communication bus 311, it is impossible without more to identify whether the abnormality has occurred in the touch panel controller 303 or the abnormality has occurred in the image output IC 307 in the first place. Therefore, in step S506, the application program 401 records that an abnormality has occurred in the operation unit CPU serial communication bus 311 (the operation unit) into the RAM 203 and the HDD 204, and also records a state in which it is unable to distinguish whether the abnormality is an abnormality in the display system or an abnormality in the operation system.

If no abnormality is detected in the communication with the operation unit CPU serial communication bus 311 (NO in step S505), the processing proceeds to step S507. Then in step S507, the application program 401 transmits an instruction for detecting an abnormality in the touch panel controller 303 to the operation unit CPU 309 via the operation unit CPU serial communication bus 311. The operation unit CPU 309 communicates with the touch panel controller 303 via the touch panel controller communication bus 304, and, if an abnormality is detected, notifies the application program 401 of the abnormality via the operation unit CPU serial communication bus 311.

If the application program 401 detects an abnormality in the touch panel controller 303 in step S508 (YES in step S508), the processing proceeds to step S509. Then in step S509, the application program 401 records, into the RAM 203, that an abnormality of being unable to correctly acquire the coordinate value of the user operation has occurred in the operation system. Further, the application program 401 also records the information indicating the abnormality into the HDD 204 at the same time. Subsequently, in step S510, the application program 401 transmits an instruction for detecting an abnormality in the image output IC 307 to the operation unit CPU 309 via the operation unit CPU serial communication bus 311. The operation unit CPU 309 communicates with the image output IC 307 via the image output IC communication bus 308, and, if an abnormality is detected, notifies the application program 401 of the abnormality via the operation unit CPU serial communication bus 311.

If it is confirmed that an abnormality in the image output IC 307 is detected in step S511 (YES in step S511), the processing proceeds to step S512. Then in step S512, the application program 401 records, into the RAM 203, that an abnormality of being unable to correctly display the screen has occurred in the display system. Further, the application program 401 also records the information indicating the abnormality into the HDD 204 at the same time, and the abnormality detection processing is ended.

Due to the execution of the abnormality detection processing, the information regarding the abnormality in the display system and the operation system is recorded into the RAM 203 and the HDD 204. The abnormality detection is carried out in the order of the operation unit CPU serial communication bus 311, the touch panel controller 303, and the image output IC 307 in FIG. 5, but the order of the processing is not especially limited.

<Processing Using Alternative Method>

Figure 6:
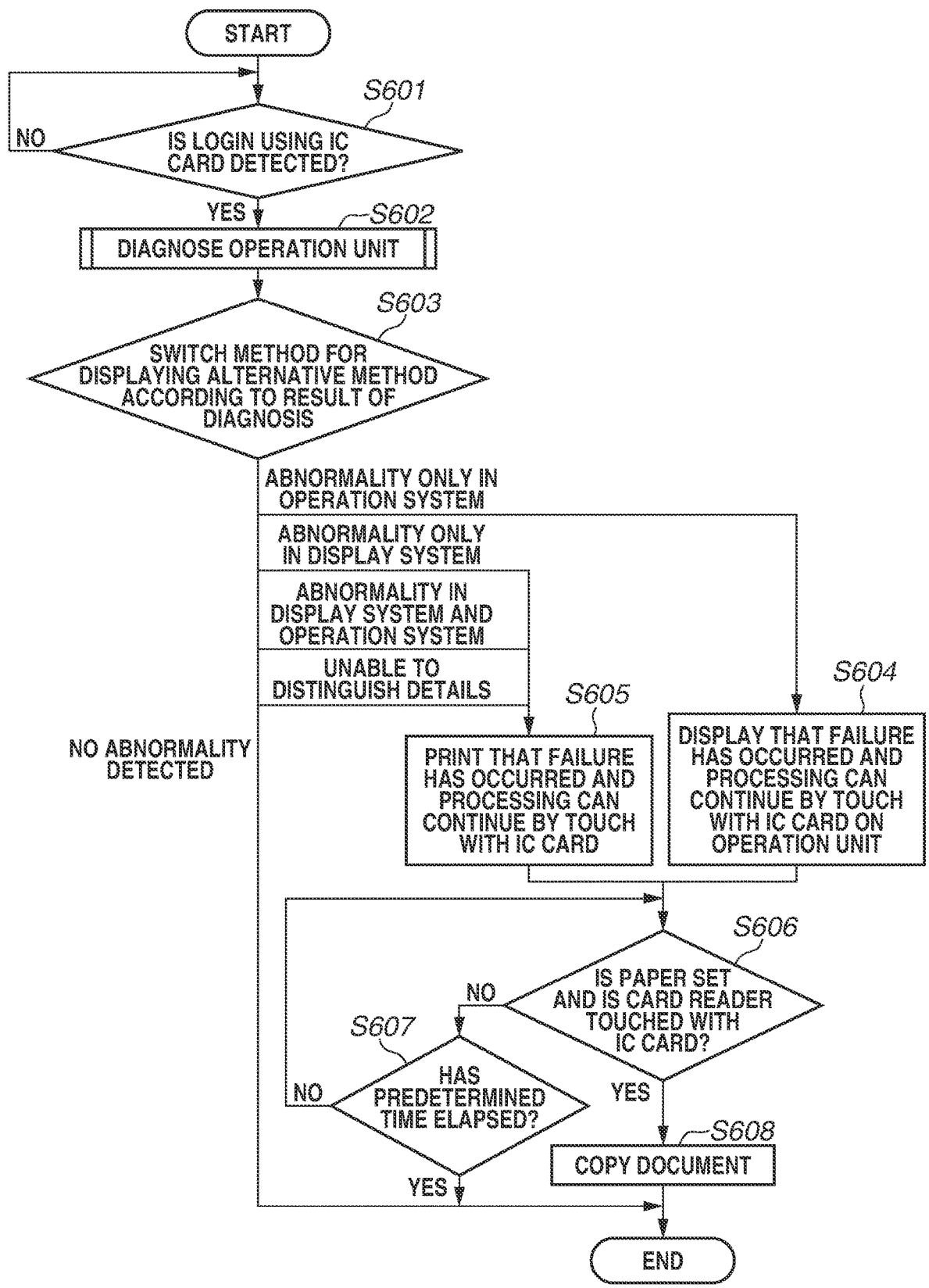
FIG. 6 is a flowchart when processing is performed based on a result of the detection of an abnormality in the operation of the operation unit.

FIG. 6 is a flowchart illustrating a flow of processing for diagnosing a failure in the operation unit 106 and causing the image processing apparatus 100 to operate using an alternative method, which is performed by the application program 401.

Figure 12:
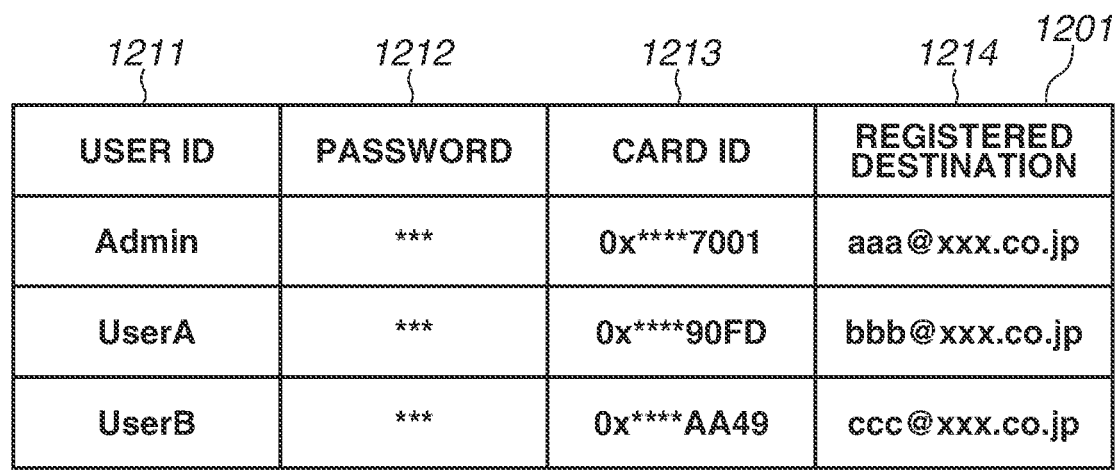
FIG. 12 illustrates an example of a table for managing user authentication information and registration information.

FIG. 12 illustrates an example of a table for managing user authentication information and registration information. The user management table 1201 includes columns for a user identification (ID) 1211, a password 1212, a card ID 1213, and a registered destination 1214. In step S601, when the card reader 107 is touched with the IC card, the card information acquisition unit 409 reads out the information in the IC card, and the authentication unit 403 determines whether this user is a valid user. More specifically, the card information acquisition unit 409 reads out the card ID 1213 like an example illustrated in FIG. 12 from the IC card, and the authentication unit 403 determines whether user information (the user ID 1211 and the password 1212) associated with the card ID 1213 is registered. The user management table 1201 as an example illustrated in FIG. 12 is stored in the RAM 203 or the HDD 204. The information referred to at the time of the user authentication may not be stored in the RAM 203 or the HDD 204 of the image processing apparatus 100, and the application program 401 may be configured to acquire the information via the network 108. In this case, the authentication unit 403 carries out the user authentication by checking whether the acquired username 1211 and password 1212 or IC card number 1213 match the information registered with the server.

FIG. 7 illustrates an example of a screen displayed on the operation unit when an abnormality has occurred only in an operation system. If the user is authenticated, in step S602, the application program 401 diagnoses a failure in the operation unit 106. This processing is performed in the manner illustrated in FIG. 5. The processing branches at step S603 according to the result of the failure diagnosis. First, if the result of the failure diagnosis indicates an abnormality only in the operation system (ABNORMALITY ONLY IN OPERATION SYSTEM in step S603), the processing proceeds to step S604. Then in step S604, the operation unit control unit 402 displays a screen 701 like the example illustrated in FIG. 7 on the operation unit 106. Besides the error code and the error location, the screen 701 also indicates that the copy processing can continue on the image processing apparatus 100, and how to recover from the failure such as cycling the power of the image processing apparatus 100. In the case of information printed in step S605, which will be described below, similar information is also presented to the user. The contents and the display manner indicated by the screen 701 are merely an example, and the screen 701 may be presented in any manner as long as it can make the user aware that the processing can continue.

In a case where an abnormality is detected only in the operation system, the operation unit 106 is in a state unable to correctly recognize the user operation but the other display system can correctly or appropriately display the information. Therefore, the application program 401 performs processing like step S604.

On the other hand, if the result of the failure diagnosis does not indicate an abnormality only in the operation system in step S603 (ABNORMALITY ONLY IN DISPLAY SYSTEM, ABNORMALITY IN DISPLAY SYSTEM AND OPERATION SYSTEM, or UNABLE TO DISTINGUISH DETAILS in step S603), the processing proceeds to step S605. Then in step S605, the job control unit 408 prints a content similar to FIG. 7. The result of the failure diagnosis does not indicate an abnormality only in the operation system, specifically when an abnormality has occurred only in the display system, when an abnormality has occurred in the display system and the operation system, or when it is impossible or at least not possible to distinguish the location at which the abnormality is detected. The application program 401 is configured to print the information that the user should be notified of via the display system because the operation unit 106 is in a state unable to present the correct information to the user via the display system when an abnormality is detected in at least the display system.

In step S606, the application program 401 waits until the user sets a paper medium onto the scanner 105 and touches the card reader 107 with the IC card. If it is determined that a predetermined time has elapsed in step S607 (YES in step S607), the application program 401 automatically logs out the user, and the present processing is ended. The time until the user is automatically logged out can be set to an arbitrary length. This time may be a preset automatic logout time or may be a fixed automatic logout time applied only when a failure has occurred.

If it is detected that paper is set and the card reader 107 is touched with the IC card in step S606 (YES in step S606), in step S608, the application program 401 starts reading the paper medium set in step S608 and carries out the copying. The application program 401 may carry out the copying according to default copy settings associated with the login user, or may read out the states of the size, the number of pages per sheet, and the color of the read paper medium, and carry out the copying according to automatically set print settings. An instruction for the copy settings may be written into a predetermined format and read out by the scanner 105, and the copying may be carried out according to the read copy settings. This is the processing according to the first exemplary embodiment. This is the processing illustrated in FIG. 6.

According to the first exemplary embodiment, if the processing on the image processing apparatus 100 can continue even in a state where an abnormality has occurred in the operation unit 106, this information can be presented to the user according to the location at which the abnormality has occurred.

A second exemplary embodiment will be described regarding a configuration that scan processing is performed when a failure has occurred in the operation unit 106. Components already described in the first exemplary embodiment will be indicated by the same reference numerals, and the descriptions thereof will be omitted below. The second exemplary embodiment will be described assuming that a scanned image is transmitted to a registered destination based on a touch with the IC card in a case where an operation desired to be performed when a failure has occurred in the touch panel can be preset.

Figure 11:
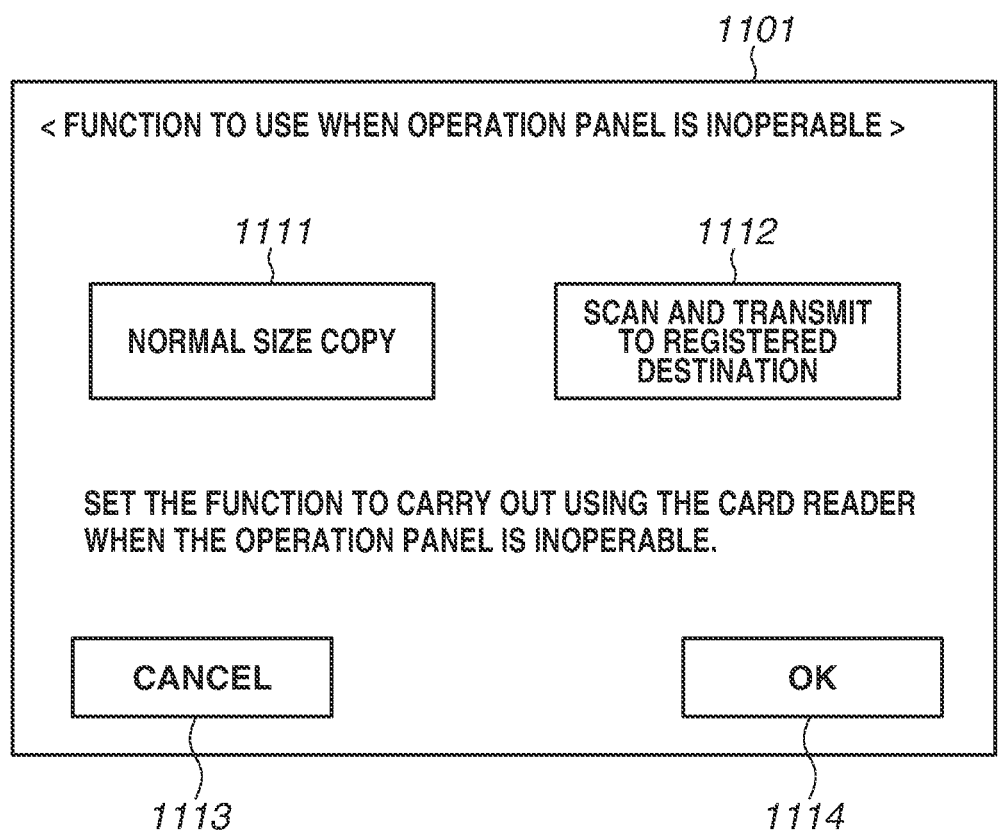
FIG. 11 illustrates an example of a setting screen for setting a function to use when an abnormality has occurred in the operation unit.

FIG. 8 illustrates a flow for continuing the scan processing or the copy processing according to the present exemplary embodiment. The processing illustrated in FIG. 8 is performed after the touch with the IC card is detected in step S606 in FIG. 6. The present flow is mainly performed by the application program 401. In step S801, the application program 401 acquires information about a function operable when a failure has occurred in the screen, which is stored in the RAM 203 or the HDD 204 in advance. FIG. 11 illustrates an example of a setting screen for setting a function to use when an abnormality has occurred in the operation unit. The information referred to at this time is setting information prepared by causing the user to select any of NORMAL SIZE COPY 1111 and SCAN AND TRANSMIT TO REGISTERED DESTINATION 1112 via a setting screen 1101 illustrated in FIG. 11 and storing a result of this selection. When the user presses the NORMAL SIZE COPY button 1111 and then an OK button 1114 on the setting screen 1101, the setting content is stored in the RAM 203 or the HDD 204, and the copying is selected in step S801. On the other hand, when the user presses the button 1112 and then the OK button 1114, the scanning is selected in step S801. Alternatively, the change in the setting is canceled by pressing a CANCEL button 1113 instead of the OK button 1114 on the above-described screen. The setting screen 1101 may be configured to be preset for each user or may be uniformly set by an administrator.

In step S801, the application program 401 determines whether the function usable at the time of a failure is the scan function by referring to the information stored in the RAM 203 or the HDD 204. If the function usable at the time of a failure is determined to be the scan function (YES in step S801), the processing proceeds to step S802. If the function usable at the time of a failure is determined not to be the scan function (determined to be the copy function) (NO in step S801), the processing proceeds to step S608. In step S608, the application program 401 carries out the copying.

FIG. 9 illustrates an example of a. table of current login user information. In step S802, the application program 401 scans the document set on the scanner 105, and stores the scanned image data into the RAM 203 or the HDD 204. In step S803, the application program 401 acquires the registered destination associated with the login user, thereby identifying the destination of the scanned data acquired in step S802. FIG. 9 also illustrates an example of the registered destination of the login user that is acquired in the present processing. The user information about the login user illustrated in FIG. 9 includes a username 911, a mail address 912, a user type 913, and a domain 914 indicating the host of the registered destination. The current login user information illustrated in FIG. 9 is merely an example, and the user information is not limited to this content.

The application program 401 refers to the mail address 912 from the current login user information 901. When the user has succeeded in the login, the authentication unit 403 generates an object in which the information about the current login user is recorded, and stores the generated object into the RAM 203. This stored information is the current login user information 901. In step S804, the application program 401 sets the registered destination of the login user as the destination to which the image data will be transmitted. In step S805, the application program 401 transmits the image data to the destination located on the network 108. Available methods for transmitting the image data include not only the method using the transmission to the mail address but also, for example, transmission to a storage in the network 108 using a protocol such as Server Message Block (SMB) or Web Distributed Authoring and Versioning (WebDAV), Alternatively, the image data may be transmitted using a method for storing the image data into a specific area in the RAM 203 or the HDD 204 in the image processing apparatus 100, publishes this data onto the network 108, and acquires the data stored by the image processing apparatus 100 from a PC or another image processing apparatus.

FIG. 10 illustrates an example of printed paper that the job control unit 408 outputs by the printer 104 when it is not determined that an abnormality has occurred only in the operation system according to the second exemplary embodiment. In this example, the printed paper indicates information output when the function operable at the time of a failure is determined to be the scanning in step S801. Similarly to FIG. 7, the printed paper 1001 indicates the alternative method to follow when a failure has occurred on the lower side of the printed paper in addition to the error information and the method for recovering from the failure. The error information, the method for recovering from the failure, and the alternative method may be output individually.

According to the second exemplary embodiment, the alternative method can be presented on the printed paper output from the printer 104 even in a case where the operation unit 106 is unusable for the operation and the display when the user logs in by a touch operation with the IC card. Then, the user can transmit the scanned image to the registered destination by setting the document onto the scanner 105 and touching the card reader 107 with the IC card. Further, the user can carry out both the copying and the scanning, provided that these functions are preset on the setting screen 1101.

A third exemplary embodiment will be described regarding a configuration assuming that a first user has touched the card reader 107 with the IC card first to execute an operation in the image processing apparatus 100 and interrupts his/her processing on the image processing apparatus 100, and then another user logs in using the IC card. Processing already described in the first exemplary embodiment or the second exemplary embodiment will be indicated by the same reference numeral, and the description thereof will be omitted below.

<Failure Diagnosis Processing According to Third Exemplary Embodiment>

Figure 13:
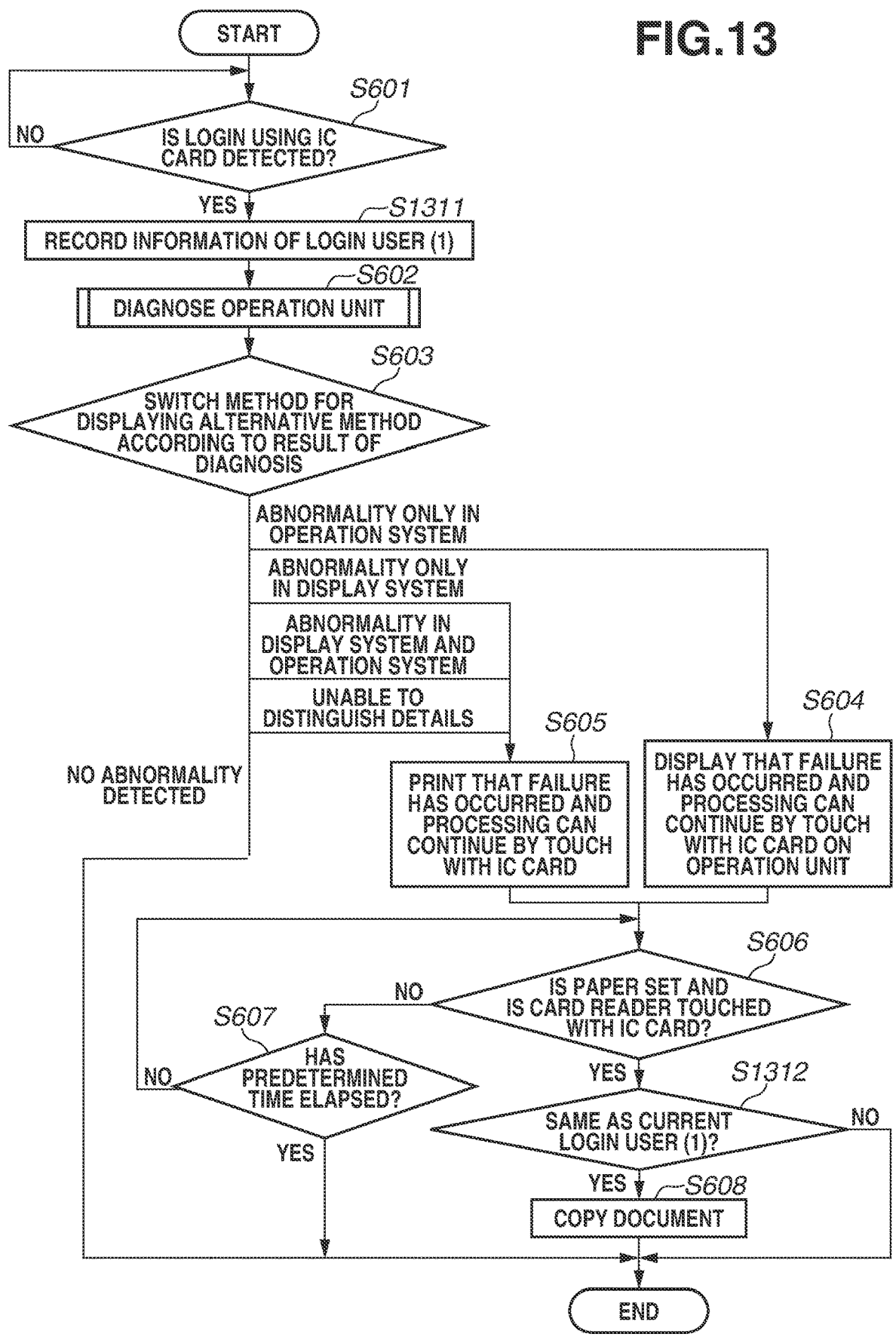
FIG. 13 is a flowchart illustrating a flow of processing for diagnosing a failure in the operation unit and causing the image processing apparatus to operate using an alternative method according to a third exemplary embodiment.

FIG. 13 is a flowchart illustrating a flow of processing performed by the application program 401 when diagnosing a failure in the operation unit 106 and causing the image processing apparatus 100 to operate using the alternative method. In step S601, the application program 401 performs the user authentication processing using the IC card. Then in step S1311, the application program 401 saves the user information of the login user into a temporary storage area in the RAM 203.

In step S606, the application program 401 detects that the paper is set, and, further, the card reader 107 reads out the information in the IC card. Then in step S1312, the card information acquisition unit 409 acquires the information in the card ID, and the application program 401 compares the acquired information with the user information saved in the temporary storage area in the RAM 203 in step S1311. The information compared at this time is not especially limited, and, for example, the application program 401 may perform the comparison with the user ID using the current login user information 901 illustrated in FIG. 9 or may perform the comparison with the value of the card ID directly. The application program 401 may use any information as long as the information allows for confirmation regarding whether the login user in step S1311 and the user who has touched the card reader 107 with the card in step S606 match each other. If the compared pieces of user information match each other (YES in step S1312), in step S608, the application program 401 continues the copy or scan operation. However, if the compared pieces of user information do not match each other (NO in step S1312), the application program 401 stops the copy or scan operation and logs out the current login user, and the processing is ended. The user can perform the processing illustrated in FIG. 6 or FIG. 13 by holding the IC card over the card reader 107 and undergoing the login authentication again. For example, if a user A holds the IC card over the card reader 107 in step S601 and a user B holds the IC card over the card reader 107 in step S606, the processing for logging out the user A is performed.

According to the third exemplary embodiment, even in a case where, subsequently to the user who has touched the card reader 107 with the IC card first, another user different from the first user attempts to operate the image processing apparatus 100 by touching the card reader 107 with the IC card, the image processing apparatus 100 can prevent the other user from, for example, incorrectly carrying out the copying or transmitting the scanned image to the registered destination of the former user.

Although the copying or the scanning function preset via the setting screen 1101 can be carried out when a failure has occurred in the operation unit 106 according to the second exemplary embodiment, the user may wish to use a function that is not the preset function. A possible example thereof is that, although a failure has occurred in the operation unit 106 in a case where the scanning is set on the setting screen 1101, the user wants to carry out the copying at this time. A fourth exemplary embodiment will be described regarding a method for allowing the user to carry out any of the copying and the scanning even when a failure has occurred in the operation unit 106. Processing already described in the above-described exemplary embodiment will be indicated by the same reference numeral, and the detailed description thereof will be omitted below.

FIG. 14 is a flowchart illustrating a flow of processing performed by the application program 401 when a failure diagnosis is performed in the operation unit 106 and the image processing apparatus 100 is caused to operate using the alternative method. In step S606, the application program 401 detects that the paper is set and the card reader 107 is touched with the IC card (YES in step S606). Then in step S1411, the application program 401 reads out the document set on the scanner 105, and temporarily stores the image acquired by the scanner controller unit 103 into the RAM 203 or the HDD 204.

FIGS. 15A and 15B each illustrate an example of a screen displayed on the operation unit when it is determined that an abnormality has occurred only in the operation unit according to the fourth exemplary embodiment. In step S1412, the application program 401 determines whether an abnormality has occurred only in the operation system by referring to the result of the failure diagnosis carried out in step S602 again. If an abnormality has occurred only in the operation system (YES in step S1412), the processing proceeds to step S1414. If it is not determined that an abnormality has occurred only in the operation system (NO in step S1412), the processing proceeds to step S1413. In step S1414, the application program 401 displays the method for continuing the scan processing and the method for continuing the copy processing on the display system. FIG. 15B also illustrates an example of a screen displayed at this time. In step S604, the application program 401 presents that the user can carry out the scanning or the copying by touching the card reader 107 with the IC card as indicated by a screen 1501 (FIG. 15A). In step S1414, the application program 401 updates the display on the operation unit 106, and displays the method for continuing the copy processing and the method for continuing the scan processing as indicated by a screen 1502 (FIG. 15B)).

In step S1413, the application program 401 prints information like the example indicated by the screen 1502 because a failure has occurred in the display system of the operation unit 106 in this case. Then, if it is detected that the card reader 107 is touched with the IC card again in step S1415 (YES in step S1415), the application program 401 controls the printer controller unit 102 and the printer 104 at step S1417 to print the image stored in the RAM 203 or the HDD 204. On the other hand, if the touch with the IC card is not detected (NO in step S1415) and the elapse of a predetermined time is measured in step S1416 (YES in step S1416), the application program 401 transmits the image stored in the RAM 203 or the HDD 204 to the registered destination of the login user in step S1418. The alternative method is presented in step S1414 or S1413 separately from step S604 or S605 in the present example, but this presentation can also be arranged in such a manner that the alternative method is displayed all at once at the time of step S604 or S605. In this case, both the procedure in the case of the scanning and the procedure in the case of the copying are presented on the screen 1501. When the card reader 107 reads out the information in the IC card in step S1415, the initial user, who has been operating the image processing apparatus 100 until this time, is logged out if the read card information indicates a login using a different card. The application program 401 may determine that the scanning is selected because the second touch with the IC card is not detected at this time and transmit the image stored in the RAM 203 or the HDD 204 to the registered destination of the initial user.

According to the fourth exemplary embodiment, even when the operation unit 106 is unusable for the operation or the display, the image processing apparatus 100 can present that the function can be selected according to the number of times of touching the card reader 107 with the IC card on the printed paper or on the operation unit 106. Then, the user can carry out both the scanning and the copying based on the number of times of touching the card reader 107 with the IC card independently of the preselected setting.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to he understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-108887, filed Jun. 11, 2019, which is hereby incorporated by reference herein in its entirety.

What is claimed is:

1. An image processing apparatus comprising:
   an operation unit including an operation system configured to receive a touch operation performed by a user, and a display system configured to display an image;
   a detection unit configured to detect a contact of an information storage medium;
   an identification unit configured to identify a location in the image processing apparatus at which an abnormality has occurred; and
   a controller configured to perform control;
   wherein, in a case where the location at which the abnormality has occurred is identified to be only the operation system and the detection unit detects the contact of the information storage medium, the controller performs control to continue processing on the image processing apparatus on the display system, and
   wherein, in a case where at least the identification unit identifies that the abnormality has occurred in the display system, the controller performs control at least to print a document indicating a method for continuing the processing on the image processing apparatus on the display system.

2. The image processing apparatus according to claim wherein, in a case where there is information regarding the abnormality, the display system displays that the processing on the image processing apparatus can continue, displays the information regarding the abnormality, and displays the method for continuing the processing.

3. The image processing apparatus according to claim 2, wherein the information regarding the abnormality includes at least the location at which the abnormality has occurred and information for identifying a content of the abnormality.

4. The image processing apparatus according to claim 1, further comprising a setting unit configured to receive a setting from the user to set the processing to be continuously performed when the abnormality has occurred in the image processing apparatus,
   wherein the processing set by the setting unit is scan processing or print processing.

5. The image processing apparatus according to claim 4, wherein, in a case where the scan processing is performed, data acquired by the scan processing is transmitted to the display system for a user currently logging in the image processing apparatus.

6. A method for an image processing apparatus having an operation system, a display system, and an information storage medium, the method comprising:
   receiving, via the operation system a touch operation performed by a user, and displaying an image via the display system;
   detecting a contact of the information storage medium;
   identifying a location in the image processing apparatus at which an abnormality has occurred; and
   performing control,
   wherein, in a case where the location at which the abnormality has occurred is identified to be only the operation system and detecting includes detecting the contact of the information storage medium, performing control includes performing control to continue processing on the image processing apparatus on the display system, and
   wherein, in a case where at least identifying includes identifying that the abnormality has occurred in the display system, performing control includes performing control at least to print a document indicating a method for continuing the processing on the image processing apparatus on the display system.

7. A non-transitory computer-readable storage medium storing a program to cause a computer to perform a method for an image processing apparatus having an operation system, a display system, and an information storage medium, the method comprising:
   receiving, via the operation system a touch operation performed by a user, and displaying an image via the display system;
   detecting a contact of the information storage medium;
   identifying a location in the image processing apparatus at which an abnormality has occurred; and
   performing control,
   wherein, in a case where the location at which the abnormality has occurred is identified to be only the operation system and detecting includes detecting the contact of the information storage medium, performing control includes performing control to continue processing on the image processing apparatus on the display system, and
   wherein, in a case where at least identifying includes identifying that the abnormality has occurred in the display system, performing control includes performing control at least to print a document indicating a method for continuing the processing on the image processing apparatus on the display system.

\* \* \* \* \*